July 26, 1955  H. H. KOCH  2,713,930
APPARATUS FOR ORIENTING HEADED ARTICLES
Filed Dec. 1, 1953  3 Sheets-Sheet 1

INVENTOR
Hermann H. Koch
BY Maurice A. Crews
ATTORNEY

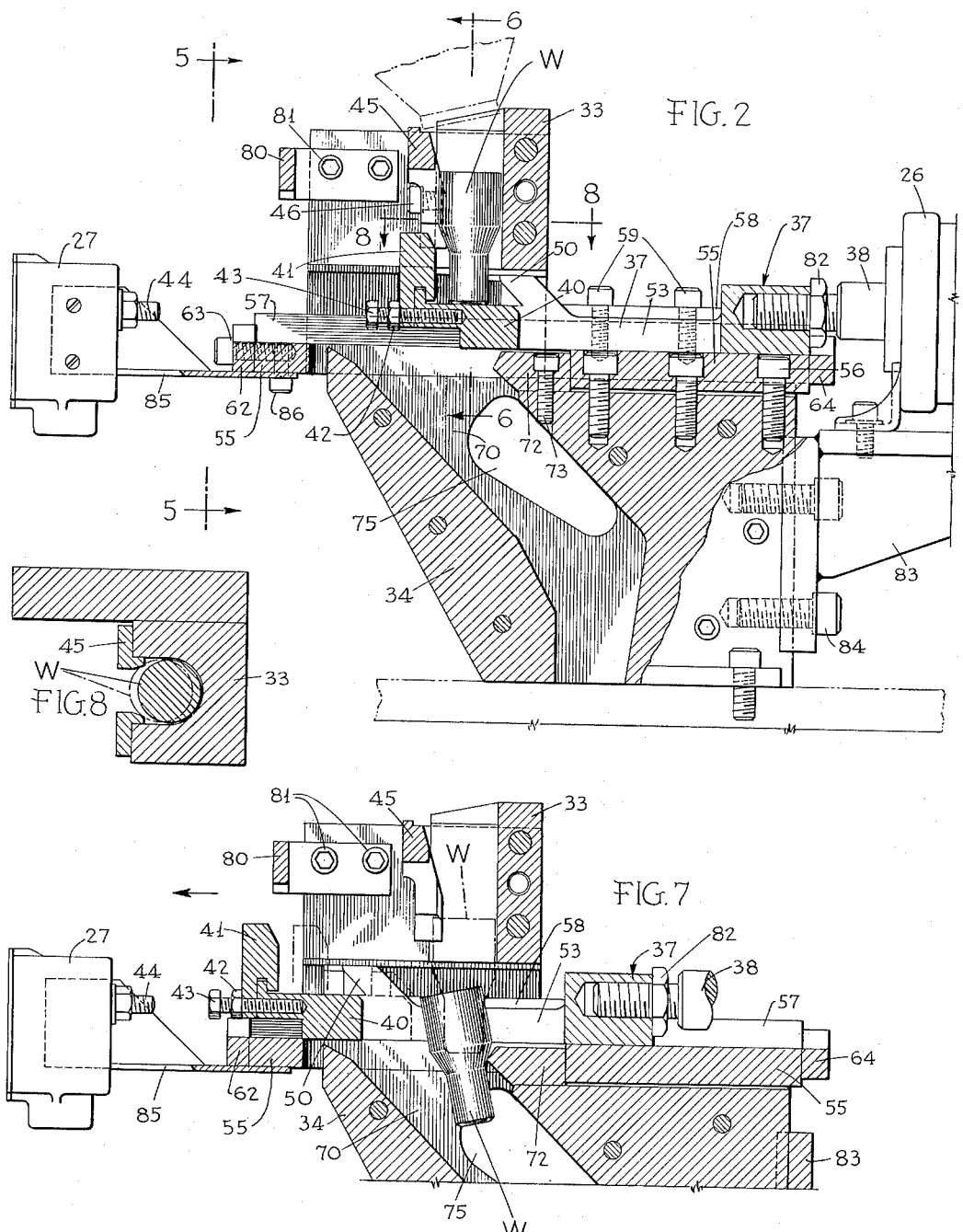

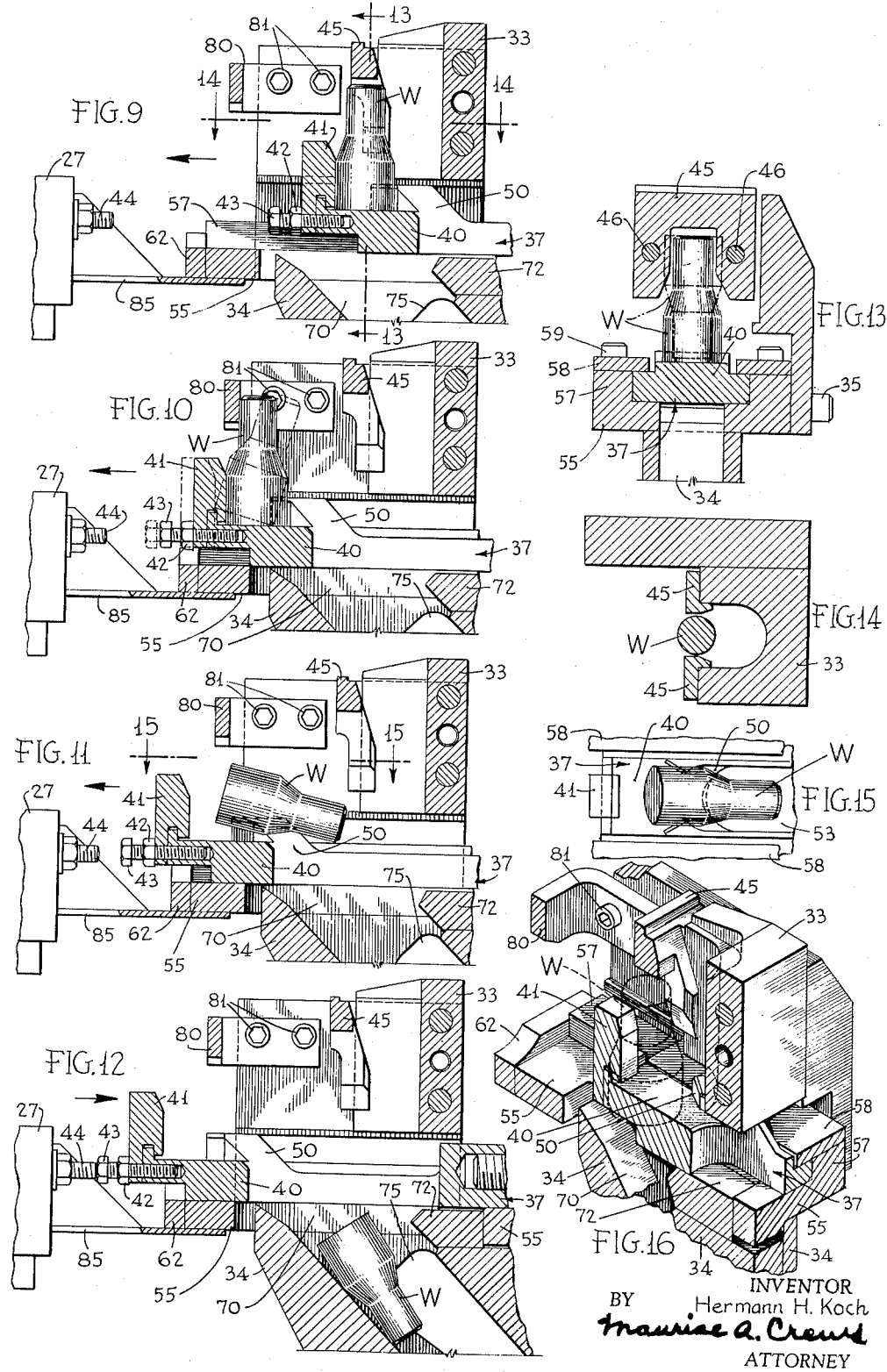

United States Patent Office 2,713,930
Patented July 26, 1955

2,713,930

APPARATUS FOR ORIENTING HEADED ARTICLES

Hermann H. Koch, Detroit, Mich., assignor to The Budd Company, Philadelphia, Pa., a corporation of Pennsylvania Application December 1, 1953, Serial No. 395,352

7 Claims. (Cl. 193—43)

This invention relates to apparatus for orienting headed articles and has for an object the provision of improved apparatus for arranging such articles with one end disposed uniformly in a given direction.

The invention has been developed in connection with apparatus for orienting cap nut slugs for automobile wheels and will be described with specific reference to this use but without intention of imposing a limitation thereby.

One of the particular objects of the invention is to provide means which can be interposed in a line of headed articles moving end-to-end in random end-disposition and which will feed them forward end-to-end in uniform end disposition, that is with the same end of all articles pointing the same way.

Another object is to provide orienting apparatus which will be positive and certain in its action.

Another object is to provide orienting apparatus which operates in a timed schedule so as to feed articles forward at a given rate.

Another object is to provide orienting apparatus which is simple and inexpensive to build and dependable and durable in service.

The above and other objects and advantages of the invention will be apparent from the following description of an exemplary embodiment shown in the accompanying drawings, in which:

Fig. 2 is an enlarged vertical section of the article orienting apparatus shown in Fig. 1;

Fig. 7 is a vertical section like Fig. 2 but showing the parts in a different position in which the slug or blank is fed down if the smaller end is lowermost or forward in the direction of travel;

Fig. 8 is a horizontal section taken on the line 8—8 of Fig. 2;

Fig. 9 is a vertical section like Fig. 7 but showing the parts near the beginning of the end-reversing action when the larger end of the slug is lowermost;

Fig. 10 is a vertical section like Fig. 9 but showing the parts in a further advanced stage of movement;

Fig. 11 is a vertical section like Figs. 9 and 10 but showing the parts in a yet further advanced position;

Fig. 12 is a vertical section like Figs. 9, 10 and 11 but showing the parts in final position after end-reversal and feed-down of the slug;

Fig. 13 is a transverse vertical section taken on the line 13—13 of Fig. 9;

Fig. 14 is a horizontal section taken on the line 14—14 of Fig. 9;

Fig. 15 is a horizontal section taken on the line 15—15 of Fig. 11; and

Fig. 16 is an isometric view taken on the longitudinal vertical section 16—16 of Fig. 3.

Figure 3:
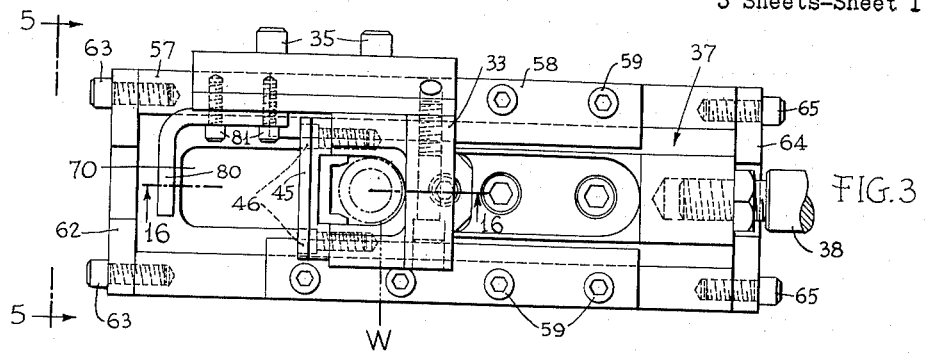
Fig. 3 is a top plan view of the apparatus shown in Fig. 2.
Figure 4:
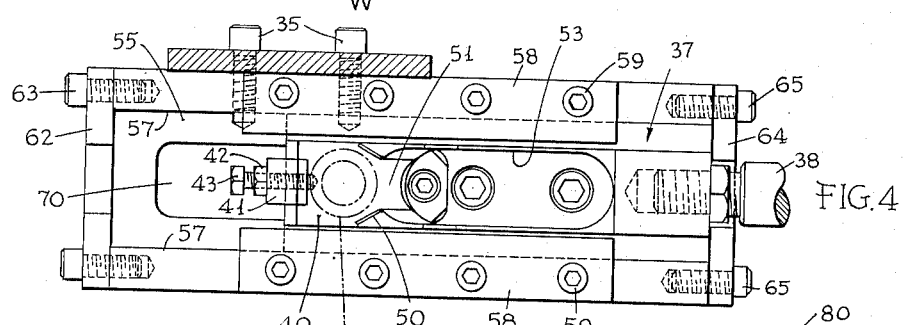
Fig. 4 is a top plan view and section taken on the line 4—4 of Figs. 2 and 5.
Figure 1:
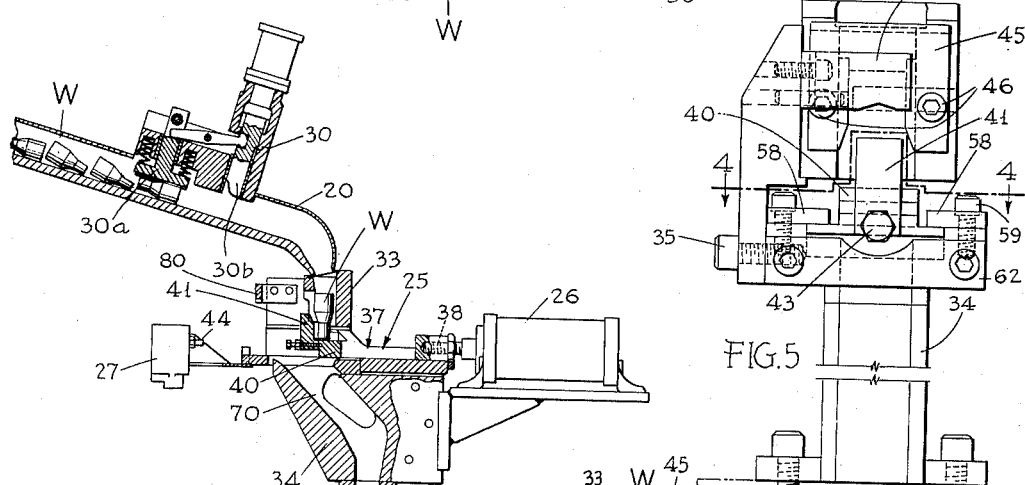
Fig. 1 is a vertical section through article feeding apparatus which includes orienting apparatus embodying the present invention.
Figure 5:
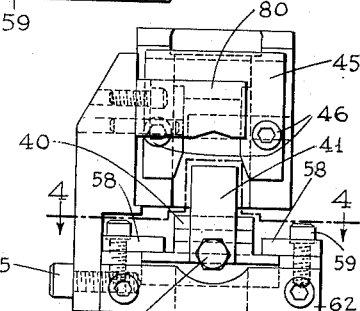
Fig. 5 is an end elevation taken on the line 5—5 of Fig. 3.
Figure 6:
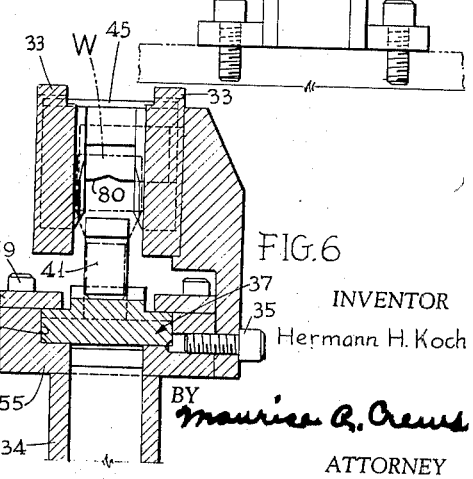
Fig. 6 is a vertical section taken on the line 6—6 of Fig. 2.

The general environment of one application of the invention is shown in Fig. 1. Here a gravity tube conveyor 20 feeds a line of blanks or slugs W down in random orientation as they are supplied from some source such as a hopper feed device. Such hopper feed devices are well known and require no illustration.

It is desired that these slugs be fed at a required rate to some processing device such as a tubular high frequency induction heater 21. Obviously such a heater will heat the line of slugs passing end-to-end therethrough more uniformly if all slugs are oriented uniformly in the same direction. If two small ends come together or if two large ends come together there will be unequal heating along the line of slugs.

The heater 21 will deliver heated slugs at a given rate, hence it is desired that the slugs will be fed to the heater at the same rate. This may be accomplished by making the delivery escapement device 22 of the heater act as a master time control, through switches or other suitable means, for the means employed for feeding slugs down to the heater.

The heater is supplied with properly oriented slugs in properly timed sequence by slug orienting mechanism, generally referred to by the numeral 25, which is especially connected with the present invention. For timing, it may be assumed that each time the escapement device 22 of the heater 21 removes a slug it will cause the power device 26 of the orienting mechanism 25 to be actuated through one cycle to feed down a slug.

The slug orienting mechanism here employed is of such design that it deals with one slug at a time, hence it is desired that means be provided for feeding down a slug after each cycle of operation of the orienting mechanism 25. For this purpose the mechanism 25 is provided with a switch 27 which is actuated each time a slug is fed to the heater and this switch causes actuation of an escapement device 30 in the feed tube 20 to release one slug at a time. Escapement devices which merely release one article at a time and hold back the others are well known and since the action of this escapement device is apparent from the illustration it need not be described in detail.

The orienting mechanism 25 comprises a positioning guide which is generally referred to by the numeral 33. Most of the components of this guide are fixed in position and carried rigidly with the main frame 34 of the orienting mechanism. Cap nuts 35 secure the upstanding part which carries guide 33 to the main frame 34.

The slugs may fall through the supply tube 20 with either end foremost or downward, Figs. 1, 2, 7 and 8 showing the action when the small end is downward and Figs. 9 to 15 showing the action when the large end is downward. Since all slugs are fed from the orienting mechanism to the heater with the small end downward, the slugs in the first case are fed straight through and the slugs in the second case are reversed in direction. A single action of the orienting mechanism will feed down the slugs in uniform orientation, small end downward, no matter which end is presented downward to the orienting mechanism itself.

The orienting mechanism comprises a reciprocable slide 37 which is connected to and operated by the piston rod 38 of the power device 26. The slide includes a stop plate element or anvil 40 upon which the ends of the slugs strike when they fall from the chute 20 into the positioning guide 33. At the front end of the slide above the plate 40 there is secured a guide element 41 adapted to cooperate with the fixed guide 33 to form a fairly close fitting receptacle for the slugs, particularly for the large end of the slugs. It is to be noted that the particular slugs dealt with in the illustrated apparatus have a head which is quite long, here approximately as long as the small end, a tapered portion connecting the large and small portions. The guide element 41 is secured to the end of the slide by a lock nut 42 on a set screw 43. The set screw 43 is adjustable for proper operation of the plunger 44 of the switch 27, this plunger also being adjustable.

For cooperation with the fixed guide 33 to hold a slug in position when it falls with the large end uppermost there is provided a side escapement element 45 which is secured to the fixed guide 33 by cap bolts 46. As best shown in Figs. 9 and 13, the side escapement element 45 has such shape as to position the slugs and hold them against side movement when they fall with the large end uppermost but to permit them to pass when they fall with the small end uppermost.

The slide 37 also comprises a movable bifurcated side escapement element 50 which engages and fits the large end of a slug to hold it against movement relative to the slide but which has a narrow passage 51 which will clear the small end of the slug and allow the slide to move out beneath the slug while its head is held against side movement by the first side escapement element 45.

The slide 37 also comprises an elongated aperture or bottom escapement element 53, Figs. 2 and 7, through which the slugs can fall when this opening is pushed beneath them and when they are held against side movement in the guide.

The slide 37 is mounted on a slide support 55 which is secured to the main frame 34 by cap bolts 56, the support 55 having side guides 57 to retain the slide laterally. Top retaining strips 58 secured by cap bolts 59 hold the slide down on the support 55.

The movement of the slide is halted at the front end by a stop plate 62 secured to the main frame 34 by cap bolts 63 and is halted at the rear end by a stop plate 64 secured by cap bolts 65.

The main frame 34 is provided with a properly shaped down passage channel 70 and a bottom tube 71 leading to the heater. A removable wear plate 72 of suitable shape is secured to the frame 34 by cap bolts 73. Openings 75 are provided on the side of the channel 70 so that the passage of the slugs may be observed.

When a slug is positioned with the small end upward in the guide 33 adjacent the side escapement 45 it will pass this escapement but the large end, which is disposed downward, cannot pass the slide escapement 50, with the result that the slug is carried along by the slide as it moves out toward the switch 27. Means are provided to cooperate with the slide for reversing the position of the slug, this means here comprising a tripping bar 80 spaced outward from the side escapement 45 which is engaged by the upper end of the slug. As shown in Figs. 9 to 15 the slide movement combined with the action of the bar 80 on the slug causes the slug to be tripped over the bifurcated escapement element 50 so as to be inverted and fed down through the opening 53 in the slide. This opening is by this time positioned over the upper end of the channel 70 and the slug is fed down this channel with its small end downward, just as it was in the first case when the small end was disposed downward in the beginning. As shown in Figs. 11 and 15, the bifurcated escapement element 50 has the proper shape to promote this end-reversal movement and the guide element 41 prevents the end of the slug from sliding forward during this action thus forcing it to rock over on the bifurcated element 50.

The upper end of the channel 70 is of such length that a slug cannot enter sidewise but must enter and pass along endwise.

The tripping bar 80 is formed as a bent piece which is secured to a fixed part by cap bolts 81.

As shown in Figs. 2 and 7, the slide 37 is adjustably connected to the piston rod 38 and is locked in adjusted position thereon by a lock nut 82. The cylinder of power device 26 is secured on a bracket 83 which is anchored to the main frame by cap bolts 84. The switch 27 is mounted on a bracket 85 which is secured to a fixed part by cap bolts 86.

In review, it will be seen that when a slug is received with the small end down, as shown in Figs. 1, 2 and 7, the large upper end will be held against side movement by the fixed side escapement 30 while the small lower end will permit the bifurcated escapement 50 of the slide 37 to move past it. Consequently, as soon as the aperture 53 of the slide comes beneath it the slug will drop down with the small end foremost and pass down to the heater 21.

The slide 37 will pass out to the end of its stroke and actuate switch 27 which causes the escapement device 30 to raise the pressure plate 30a to drop the line of slugs down to the release abutment 30b. By the time the slide has returned to initial position with the plate 40 located beneath the guide 33 the escapement device 30 has completed its action to grip the line of slugs above the released end slug and to feed the end slug down to the orienting device ready for the next cycle of action.

When a slug is received with the large end downward the action shown in Figs. 9 to 15 will occur, as described above. The large end cannot pass the escapement 50 of the slide so the entire slug will be pushed sidewise, the slug passing the fixed side escapement 45 because the small end is uppermost. Near the end of the outstroke the tripping bar 80 causes end reversal of the slug at a time when the opening 53 of the slide has moved over far enough to allow the slug to fall on its side on the sloping portion of the channel 70 and move away with its small end downward. The release action to obtain a new slug from the feed tube 20 is the same as before.

It is thus seen that the invention provides improved means for orienting headed articles and delivering them one at a time in uniform orientation. The mechanism is positive in action, not depending on gravity for its critical action, and is sturdy and reliable.

While one embodiment has been disclosed by way of illustration it is to be understood that there may be various embodiments within the scope of the invention.

What is claimed is:

1. Apparatus for orienting headed articles which are fed thereto in random endwise orientation one at a time, comprising in combination, a pair of side escapement devices having relative lateral movement with respect to each other, one of said escapement devices being of a size and shape to pass a headed article when it is oriented in one direction and the other of said escapement devices being of a size and shape to pass the headed article when it is oriented in the reverse direction, means for positioning a headed article between said escapement devices, means for moving said escapement devices relatively past each other, means for discharging the article directly along the axis of its initial position when it passes one of said escapement devices, and means at a distance to one side of the initial position and the other escapement device for reversing the direction of the article when it passes the other of said escapement devices.

2. Apparatus for orienting headed articles which are fed thereto in random orientation one at a time along the line of their axes, comprising in combination, guide means for directing headed articles one at a time to an orienting position, a fixed side escapement having an opening of a size and shape to pass an article when oriented in a first direction but not in the reverse or second direction, said guide means and fixed escapement retaining an article without side movement relative to its initial position when it is oriented in the second direction, a movable side escapement of a size and shape to pass an article when oriented in the second direction but not in the first, means for producing side movement of said escapements relative to each other and to an article disposed between them, means for passing an article away from said escapements when it is oriented in the second direction, and means for reversing an article and passing it away when it is disposed in the first direction.

3. Apparatus for orienting headed articles which are fed down endwise one at a time along a generally vertical axial line, comprising in combination, guide means for holding an article in a fixed position, a slide having a plate upon which the article rests when in said guide, a fixed side escapement at one side of said guide having a size and shape to allow said article to pass when a first end is uppermost but to retain it when the other or second end is uppermost, an escapement element on said slide at the other side of said guide from said first escapement for passing said article when the second end is uppermost but to engage it and move it sidewise when the first end is uppermost, an opening in said slide beyond its escapement element which comes beneath the article and allows it to fall downward when it passes the slide escapement element and is held against side movement by said fixed escapement element, and means cooperating with said slide escapement element for reversing the article and dropping it through the opening in said slide when the article is held by said slide escapement element but passes said fixed escapement.

4. Apparatus for orienting headed articles which are fed down endwise one at a time along a generally vertical axial line, comprising in combination, guide means for holding an article in a fixed position, a slide having a plate upon which the article rests when in said guide, a fixed side escapement at one side of said guide having a size and shape to allow said article to pass when a first end is uppermost but to retain it when the other or second end is uppermost, an escapement element on said slide at the other side of said guide from said first escapement for passing said article when the second end is uppermost but to engage it and move it sidewise when the first end is uppermost, an opening in said slide beyond its escapement element which comes beneath the article and allows it to fall downward when it passes the slide escapement element and is held against side movement by said fixed escapement element, and means cooperating with said slide escapement element for reversing the article and dropping it through the opening in said slide when the article is held by said slide escapement element but passes said fixed escapement, said reversing means including a transverse bar located at a distance above said slide to engage the upper end of an article carried by said slide past said fixed side escapement.

5. Apparatus for orienting headed articles which are fed down endwise one at a time along a generally vertical axial line, comprising in combination, guide means for holding an article in a fixed position, a slide having a plate upon which the article rests when in said guide, a fixed side escapement at one side of said guide having a size and shape to allow said article to pass when a first end is uppermost but to retain it when the other or second end is uppermost, an escapement element on said slide at the other side of said guide from said first escapement for passing said article when the second end is uppermost but to engage it and move it sidewise when the first end is uppermost, an opening in said slide beyond its escapement element which comes beneath the article and allows it to fall downward when it passes the slide escapement element and is held against side movement by said fixed escapement element, and means cooperating with said slide escapement element for reversing the article and dropping it through the opening in said slide when the article is held by said slide escapement element but passes said fixed escapement, said reversing means including a transverse bar located at a distance above said slide to engage the upper end of an article carried by said slide past said fixed side escapement, and the side escapement on the slide having a shape to cause the article to turn over it and reverse ends when the upper end of the article is engaged by said transverse bar.

6. Apparatus for orienting headed articles which are fed down endwise one at a time along a generally vertical axial line, a guide for holding an article laterally in a fixed position, a part having an offtake passage therein which will pass articles endwise only, a slide movable transversely across the space between said guide and said offtake passage, a plate carried by said slide for stopping an article when it falls into said guide, an opening in said slide movable between said guide and offtake passage for passing an article endwise from the guide to the passage, an escapement device on said slide located between the plate and opening of the slide for passing an article when the small end is disposed downward but for engaging the side of the article when the large end is disposed downward, a fixed side escapement at said guide for passing an article when the small end is uppermost but holding the article against side movement when the large end is disposed uppermost, the article dropping with the small end downward through the opening in the slide into said offtake passage when it is received in the guide with the large end disposed upward, and an upsetting bar cooperating with the escapement on the slide for reversing an article and passing it through the opening in the slide and into said offtake passage with the small end lowermost.

7. Apparatus for orienting headed articles which are fed down endwise one at a time along a generally vertical axial line, a guide for holding an article laterally in a fixed position, a part having an offtake passage therein which will pass articles endwise only, a slide movable transversely across the space between said guide and said offtake passage, a plate carried by said slide for stopping an article when it falls into said guide, an opening in said slide movable between said guide and offtake passage for passing an article endwise from the guide to the passage, an escapement device on said slide located between the plate and opening of the slide for passing an article when the small end is disposed downward but for engaging the side of the article when the large end is disposed downward, a fixed side escapement at said guide for passing an article when the small end is uppermost but holding the article against side movement when the large end is disposed uppermost, the article dropping with the small end downward through the opening in the slide into said offtake passage when it is received in the guide with the large end disposed upward, and an upsetting bar cooperating with the escapement on the slide for reversing an article and passing it through the opening in the slide and into said offtake passage with the small end lowermost, said slide also having an element disposed forward of said plate which in one position forms a part of said article-receiving guide and which in another position of the slide forms a retaining means for holding the end of an article as it is being end-reversed by said bar and said escapement on the slide.

References Cited in the file of this patent

UNITED STATES PATENTS

| | | |
|---|---|---|
| 2,137,173 | Malloy | Nov. 15, 1938 |
| 2,394,836 | Armstrong | Feb. 12, 1946 |
| 2,662,626 | Graham et al. | Dec. 15, 1953 |